Figure 3:
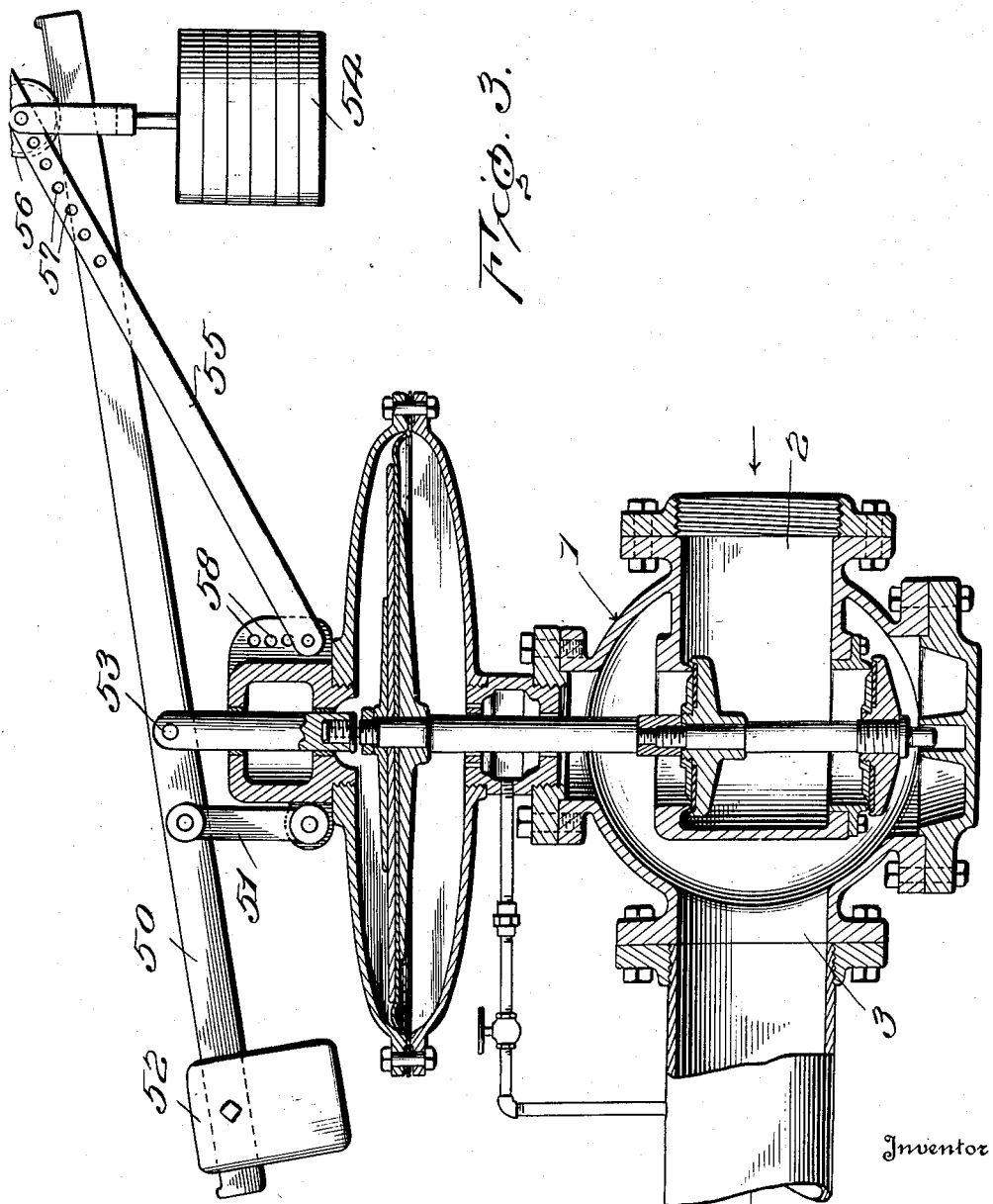

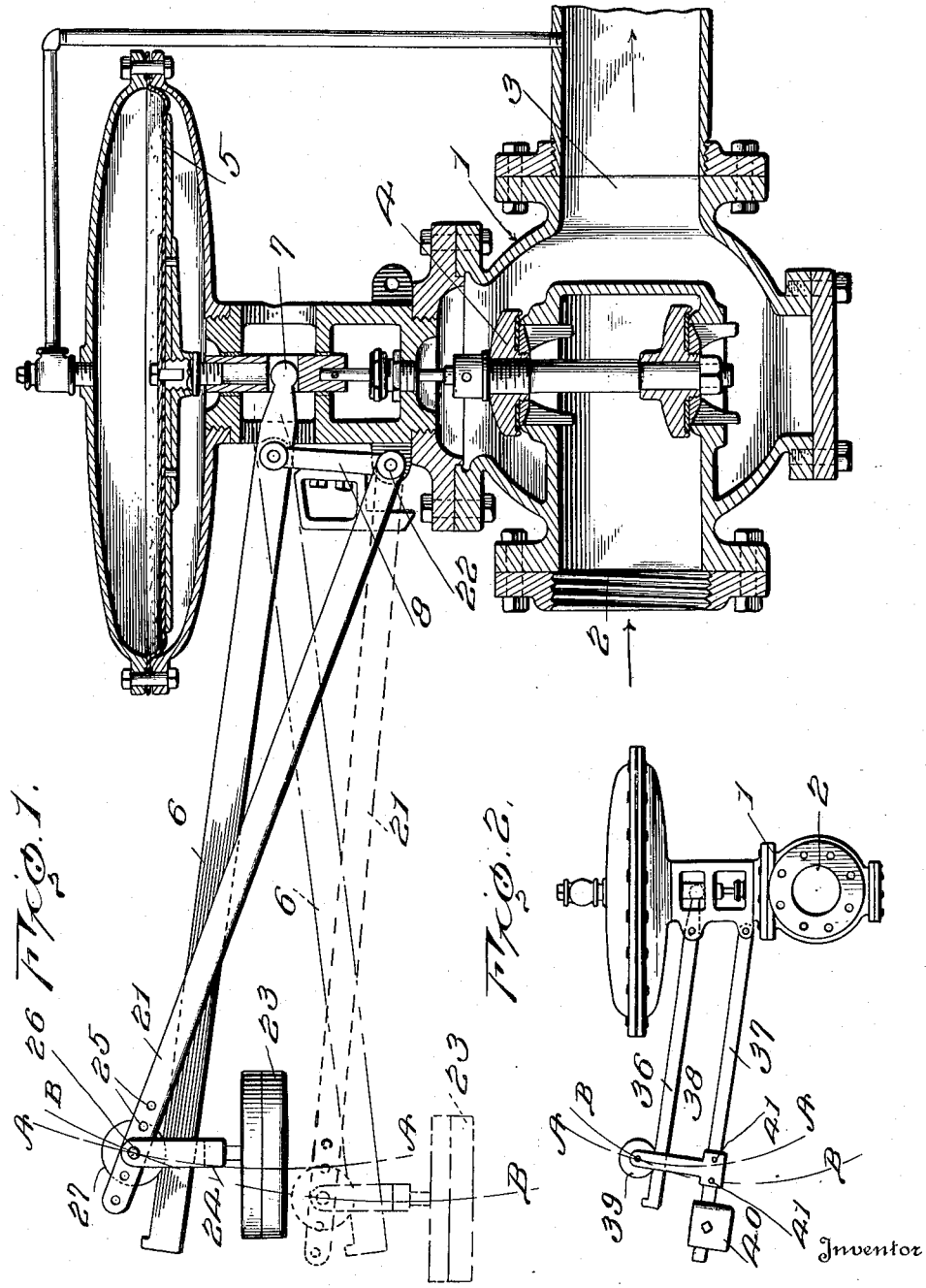

Dec. 9, 1924.  
W. S. RALSTON  
PRESSURE REGULATOR  
Filed July 5, 1921

1,518,353

2 Sheets-Sheet 2

Inventor  
William S. Ralston  
By McGill and Magnus  
his Attorneys

Patented Dec. 9, 1924.

1,518,353

UNITED STATES PATENT OFFICE.

WILLIAM S. RALSTON, OF PITTSBURGH, PENNSYLVANIA, ASSIGNOR TO THE CHAPLIN-FULTON MANUFACTURING COMPANY, OF PITTSBURGH, PENNSYLVANIA, A CORPORATION OF PENNSYLVANIA.

PRESSURE REGULATOR.

Application filed July 5, 1921. Serial No. 482,324.

*To all whom it may concern:*

Be it known that I, WILLIAM S. RALSTON, of Pittsburgh, in the county of Allegheny and State of Pennsylvania, have invented certain new and useful Improvements in Pressure Regulators; and I do hereby declare the following to be a full, clear, and exact description of the invention, such as will enable others skilled in the art to which it appertains to make and use the same.

This invention relates to pressure regulators, and particularly to such as include a casing having an inlet and an outlet, a balanced valve controlling communication between such inlet and outlet, the valve being seated through the instrumentality of a diaphragm connected with the valve stem and which diaphragm is subjected to pressure from the outlet side of the regulator, a weighted lever being employed to resist the closing action of the diaphragm. Pressure regulators, as is well known, are subjected to extremely heavy loads at certain intervals in a day and during these periods there is a noticeable drop in pressure at the outlet of the regulator where, because of the demand, there should be a slight increase in pressure. Recourse is frequently had to a manual adjustment of the diaphragm controlling weight to compensate for the heavy pull, the weight being again manually moved when normal conditions are restored.

It is the object of my invention to produce a regulator which will automatically maintain a constant outlet pressure during normal loads, and during peak load periods, the device being capable of such adjustment as to insure maintenance of a constant outlet pressure during normal load periods, and an increased outlet pressure during peak load periods.

In the drawings, Figure 1 is a vertical sectional view of a low pressure regulator equipped with my improvements, the position of the lever and the weight supporting arm when the valve is open being indicated in dotted lines. Figure 2 shows in side elevation a slightly different arrangement of lever control, and in Figure 3 there is shown a further modification of the leverage mechanism.

The pressure regulator shown in the drawings is the well known "Fulton" apparatus and includes a casing 1, inlet port 2, outlet 3, balanced valve 4 having its stem operably connected with the depending stem of the diaphragm 5. In Figure 1 a lever 6 is shown connected with the diaphragm stem at 7 and pivoted on a cut off link 8 which is in turn pivotally connected with the casing.

Referring to Figure 1, two side bars which form a supporting arm 21 are attached at one end of the casing by the same means, a pin 22, which latter also effects the connection between the cut off link and casing, this supporting arm 21 forming a carrier for a weight 23 suspended from a hanger 24 which is adapted to be operably secured to the carrier through any one of the holes 25 of the latter by a stud 26. This stud performs the additional function of an axis for a grooved wheel 27 through which the power of the weight is communicated to the lever 6, the wheel having rolling contact with the lever. Variation in outlet pressure due to the ordinary variation in the inlet pressure or outlet load is usually small and not objectionable, while a wide variation in inlet pressure or outlet load causes a greater fluctuation in outlet pressure, and this excessive fluctation is compensated for through the instrumentality of the rolling connection of the weight with the lever. The amount of travel of the grooved wheel 27 on the lever 6 may, manifestly from the described construction be increased or diminished and depends on the distance between the fulcrum of the lever and the supporting arm pin 22 and also the distance between the lever fulcrum and the grooved wheel 27. The construction is such that adjustment may be had which will insure a maintained constant pressure or one which will effect an increase with the load.

In Figure 2 I have shown a slightly modified arrangement of the weight supporting means, a primary lever 36 being fulcrumed on the casing and a secondary lever or supporting arm 37 also having its pivot connection with the casing. The two levers are arranged in spaced parallelism, one above the other, and to the secondary lever 37 is secured a roller bearing sheave 38, the wheel 39 having rolling contact with the lever 36. A weight 40 is appropriately secured on the outer end of the secondary lever and is capable of being variably positioned on said lever. The roller bearing sheave may be moved in or out on the secondary lever by simply loosening the set screws 41. This permits of ready adjustment to secure, when the sheave is moved outwardly, constant pressure, or when the sheave is moved toward the pivot of the lever, a pressure commensurate with the load, the weight thus becoming more effective.

The effectiveness of my improvement in the art for maintaining a constant outlet pressure during normal load periods, and an increased outlet pressure during peak load periods, is graphically shown (see Figs. 1 and 2) by the lines A, B, the former being the arc of a circle with the fulcrum of the main lever as a center, and the line B being an arc of a circle whose center is the pivot pin of the supporting arm or secondary lever, these lines clearly showing that as the valve 4 opens and the outer end of the lever 6 (or the lever 36 of Figure 2) descends, the grooved wheel rolls out. The effect of the weight will be greater when the valve is open than when closed, resulting in a higher outlet pressure during peak loads.

The regulator shown in Figure 3 includes a leverage connection between the weight and the stem of the diaphragm which may be adjusted on the field for any type of regulation desired, an increased outlet pressure during peak loads, or a constant pressure at all loads. A lever 50 is pivotally secured to a link 51 which is connected with a part of the diaphragm casting. The lever 50 has a counterweight 52 on its short arm and is connected with the diaphragm stem at 53. The power of a weight 54 carried by a secondary lever 55 is transmitted to the lever 50 through a roller 56 adapted for variable adjustment on the lever 55, a series of holes 57 for the roller axle being provided. Adjustment of the roller on the outer end of the secondary lever and variation of the position of the inner end of the lever on the valve casing, for which purpose a series of openings 58 are provided in an ear on the casing, regulates the pressure, causing an increased outlet pressure during peak loads, or a constant pressure at all loads, determined by the emplacement of the weight on the lever 50.

I claim as my invention:

1. In a regulator of the type including a casing, a valve, a stem for said valve, a diaphragm, a lever, and a controlling weight acting directly upon said lever, such diaphragm and lever cooperating each with the other and with said valve for effecting actuation of the valve under influence of pressure on said diaphragm, means for applying the weight of said lever to automatically maintain the valve in position to effect an increased outlet pressure during peak loads or a constant outlet pressure at all loads, or an increase in pressure with an increase in load.

2. In a regulator of the type including a casing, a valve, a stem for said valve, a diaphragm, a lever, and a controlling weight acting directly upon said lever, such diaphragm and lever cooperating each with the other and with said valve for effecting actuation of the valve under influence of pressure on said diaphragm, means for applying the weight of said lever to automatically maintain the valve in position to effect an increased outlet pressure at all loads, or an increase in pressure with an increase in load, and means for effecting a variation of position of said weight applying means relatively to said weight controlled lever.

3. In a regulator of the type including a casing, a valve, a stem for said valve, a diaphragm and a weight controlled lever, such diaphragm and lever cooperating each with the other and with said valve for effecting actuation of the valve under influence of pressure on said diaphragm, means for applying the weight of said lever to automatically maintain the valve in position to effect an increased outlet pressure during peak loads or a constant outlet pressure at all loads, or an increase in pressure with in increase in load, comprising a supporting arm pivoted to said casing, and to which the weight for said lever is relatively fixed, and a rolling connection between said arm and said lever.

4. In a regulator of the type including a casing, a valve, a stem for said valve, a diaphragm and a weight controlled lever, such diaphragm and lever cooperating each with the other and with said valve for effecting actuation of the valve under influence of presure on said diaphragm, means for applying the weight of said lever to automatically maintain the valve in position to effect an increased outlet pressure at all loads, or an increase in pressure with an increase in load, comprising a supporting arm pivoted to said cas'ng, to which the weight for said lever is relatively fixed, and a rolling connection between said arm and said lever, and means for increasing or decreasing the effectiveness of said weight applying means.

5. In a regulator of the type including a casing, a valve, a stem for said valve, a diaphragm and a weight controlled lever, such diaphragm and lever cooperating each with the other and with said valve for effecting actuation of the valve under influence of presure on said diaphragm, means for applying the weight of said lever to automatically maintain the valve in position to effect an increased outlet pressure dur'ng peak loads or a constant outlet pressure at all loads, or an increase in pressure with an increase in load, comprising a supporting arm adapted for pivotal connection with said casing through any one of a series of spaced openings, the weight for said lever being secured to said arm at selective points adjacent its outer end, and a rolling connection between said arm and said lever.

6. In a regulator of the type including a casing, a valve, a stem for said valve, a diaphragm, a lever, a controlling weight acting directly upon said lever, said diaphragm and lever cooperating each with the other and with said valve for effecting actuation of the valve under influence of pressure on said diaphragm, and means influencing said weight for automatically operating said lever to maintain the valve at any position with respect to its seat to accommodate the varying conditions of pressure and loads.

7. In a regulator of the type including a casing, a valve, a stem for said valve, a diaphragm and a weight controlled lever, such diaphragm and lever cooperating each with the other and with said valve for effecting actuation of the valve under influence of pressure on said diaphragm, means for applying the weight of said lever to automatically maintain the valve in position to effect an increased outlet pressure during peak loads or a constant outlet pressure at all loads, or an increase in pressure with an increase in load, comprising a supporting arm pivoted to said casing, and having a movable connection with said lever, and the weight for said lever carried by said arm.

8. In a regulator of the type including a casing, a valve, a stem for said valve, a diaphragm, a lever, such diaphragm and lever cooperating each with the other and with said valve for effecting actuation of the valve under influence of pressure on said diaphragm, means movable lengthwise of said lever in engagement therewith for automatically operating said lever to maintain the valve in any position with respect to its seat to accommodate the varying conditions of pressure and loads.

9. In a regulator of the type including a casing, a valve, a stem for said valve, a diaphragm, and a weight controlled lever, said lever and diaphragm cooperating each with the other and with said valve for effecting actuation of the valve under influence of pressure on said diaphragm, means for applying the weight of said lever for movement in a plane parallel thereto for automatically maintaining the valve at any position with respect to its seat to accommodate the varying conditions of pressure and loads.

In testimony whereof I have signed this specification.

WILLIAM S. RALSTON.